(12) United States Patent
Hattori et al.

(10) Patent No.: US 7,051,893 B2
(45) Date of Patent: May 30, 2006

(54) LIQUID CONTAINER, LIQUID CONTAINER MANUFACTURING METHOD, AND METALLIC MOLD FOR LIQUID CONTAINER MANUFACTURING METHOD

(75) Inventors: Shozo Hattori, Tokyo (JP); Hajime Yamamoto, Yokohama (JP); Eiichiro Shimizu, Yokohama (JP); Hiroshi Koshikawa, Kawasaki (JP); Hiroki Hayashi, Yokohama (JP); Kenji Kitabatake, Kawasaki (JP); Yoshio Koike, Kyoto (JP); Tetsuya Fukumoto, Kyoto (JP)

(73) Assignees: Canon Kabushiki Kaisha, Tokyo (JP); Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 09/968,013

(22) Filed: Oct. 2, 2001

(65) Prior Publication Data

US 2002/0040908 A1 Apr. 11, 2002

(30) Foreign Application Priority Data

Oct. 5, 2000 (JP) ............................. 2000-306263

(51) Int. Cl.
B65D 25/14 (2006.01)
(52) U.S. Cl. ............. 220/4.13; 220/62.22; 220/495.01; 220/723
(58) Field of Classification Search ............ 220/62.22, 220/495.01, 723, 4.12, 4.13, 4.14, 4.15
See application file for complete search history.

(56) References Cited

U.S. PATENT DOCUMENTS

| | | | |
|---|---|---|---|
| 3,023,461 A * | 3/1962 | Sherman | 264/515 |
| 3,606,958 A * | 9/1971 | Coffman | 220/62.22 |
| 3,912,107 A * | 10/1975 | Baumann | 220/563 |
| 5,435,452 A | 7/1995 | Nishigami et al. | |
| 5,975,330 A * | 11/1999 | Sasaki et al. | 220/495.01 |
| 5,989,482 A * | 11/1999 | Sagawa | 264/515 |
| 6,382,783 B1 * | 5/2002 | Hayashi et al. | 347/85 |

FOREIGN PATENT DOCUMENTS

| | | |
|---|---|---|
| EP | 0 548 423 | 12/1993 |
| EP | 0 596 142 | 5/1994 |
| EP | 0 759 399 | 2/1997 |
| EP | 0 865 898 | 9/1998 |
| EP | 1108592 * | 6/2001 |
| JP | 5-310265 | 11/1993 |
| JP | 7-88943 | 4/1995 |
| JP | 9-267483 | 10/1997 |

* cited by examiner

OTHER PUBLICATIONS

Online Machine Translation of JP a05-310265, five pages from JPO web site.*

*Primary Examiner*—Gary E. Elkins
(74) *Attorney, Agent, or Firm*—Fitzpatrick, Cella, Harper & Scinto

(57) ABSTRACT

A liquid container includes an outer wall constituting a casing, an inner wall constituting an inner bladder for accommodating liquid, with the inner bladder having an outer shape substantially equivalent to an inner shape of the outer wall, and the inner bladder having a flexibility and being separable from the casing, and a pinch-off portion where portions of the inner wall are welded to each other and are pinched by the outer wall to be supported by the outer wall. The inner wall includes a thicker portion having a larger thickness than another portion of the inner wall at both sides of the welded portion, and a cavity is provided between an outer surface of the thicker portion of the inner wall and an inner surface of a corresponding portion of the outer wall.

9 Claims, 8 Drawing Sheets

LIQUID CONTAINER, LIQUID CONTAINER MANUFACTURING METHOD, AND METALLIC MOLD FOR LIQUID CONTAINER MANUFACTURING METHOD

FIELD OF THE INVENTION AND RELATED ART

The present invention relates to a liquid container, a liquid container manufacturing method, and a metallic mold used for a liquid container manufacturing method. In particular, it relates to such a multi-layer liquid container that is manufactured by blow molding, and is provided with a liquid outlet to be connected to the inlet of an external object to which the liquid is supplied, a method for manufacturing such a multi-layer liquid container, and a metallic mold used for a method for manufacturing such a multi-layer liquid container.

In recent years, a multi-layer container formed by blow molding has come to be used as a liquid container in various fields. Blow molding is a manufacturing method. In blow molding, thermoplastic resin is formed into a tubular parison by extrusion; a parison is sandwiched by metallic molds from the direction perpendicular to the axial line of the parison, making the tubular parison into a pouch; air is blown into the pouch-like parison to inflate the parison so that the wall of the inflated parison is pressed against the internal surface of the metallic molds, without leaving a gap.

When manufacturing a container with a basic blow molding method, a portion called a pinch-off portion is formed at one or both of the two ends of a tubular parison of thermoplastic resin, at which one of the mutually facing portions of the parison wall meets with the other portion of the parison wall, and welds thereto. When the welding seam is weak, the container can be cracked along the welding seam by external impact or the like. Thus, it is very desirable from the standpoint of safety, in particular, when ink, a chemical, or the like, is stored therein, that the welding seam is highly impact resistant and leakproof.

Referring to FIG. 1, a referential code 100 designates a conventional liquid container formed by blow molding (which hereinafter may be referred to as a blow molded container). In the case of this container 100, in order to improve the fastness of the welding seam in the pinch-off portion 101 of the liquid container 100, the pinch-off portion 101 was allowed to outwardly protrude to increase the welding surface in the pinch-off portion.

Also referring to FIG. 1, the blow molded container 100 is a multi-layer container, and generally comprises an outer layer, a middle layer 100b, and an inner layer 100c. The fastness of the welding seam of this type of multi-layer container is dependent upon not only the strength of the adhesion between the adjacent two layers of the container wall, but also upon the how the opposing two portions of the inner layer 100c are welded to each other. Thus, simply allowing the pinch-off portion 101 to outwardly protrude allows the portions of the middle and inner layers 100b and 100c in the pinch-off portion to remain virtually the same in thickness from the base portion of the pinch-off portion to the tip of the pinch-off portion. Therefore, simply allowing the pinch-off portion to outwardly protrude does not substantially increase the strength of the welding seam, although it increases the welding surface.

In order to solve this problem, a blow molded container such as a container 110 shown in FIG. 3 has been proposed (Japanese Laid-Open Patent Application 7-88943).

The pinch-off portion 111 of the blow molded container 110 in the above proposal has two recesses 112 and 113, which are on the opposite sides of the pinch-off portion 110 and are staggered relative to each other in the height direction of the pinch-off portion 110. The recesses 112 and 113 are formed when the container 110 is formed by blow molding using a two-piece mold, which have a protrusion which protrudes from the portion correspondent to the pinch-off portion 111 of the container 110. More specifically, the protrusion of the left piece of the mold and the protrusion of the right piece of the mold are staggered in terms of the height direction of the pinch-off portion 111. Thus, as the left and right pieces of the mold are clamped against each other, the middle and inner layers 110b and 110c are pushed up, increasing the welding surface at which the left and right portions of the outer layer 110a weld to each other.

As is evident from the above description, according to the above described proposal, the fastness of the welding seam of the multi-layer liquid container formed by blow molding, in terms of impact resistance and being leakproof, is improved by allowing the pinch-off portion to outwardly protrude.

There has been another proposal (Japanese Laid-Open Patent Application 5-310265) for improving the fastness of the welding seam of the multi-layer container. This proposal concerns a blow molded multi-layer liquid container which has an outer layer, which is not likely to be deformed by external pressure, and an inner layer which is deformable by pressure. Also in this proposal, the pinch-off portion is caused to outwardly project to increase the welding surface between the opposing portions of the inner layer, in the pinch-off portion.

However, in both of the above described proposals, the pinch-off portions are caused to outwardly protrude from the outward surface of the liquid container. Therefore, the protruding pinch-off portion of the container hinders container usage, sometimes preventing the container from properly functioning. Further, if the position of the pinch-off portion of a container coincides with the portion of the container, which is directly grasped by the hand of a user, the container is difficult to handle, and also there is a possibility that the hand of a user might be injured. Also, the protruding pinch-off portion is undesirable in terms of external appearance.

In the case of a container, the multiple layers of which are separable among themselves, even when the welding surface between the opposing portions of the inner layer was increased by causing the pinch-off portion to outwardly protrude, the fastness of the welding seam could not be increased in terms of impact resistance and being leakproof, because the outer and inner layers of the container are separable from each other.

The primary object of the present invention is to provide a liquid container, the pinch-off portion of which does not outwardly protrude from the outward surface of the liquid container, in practical terms, and which is manufacturable by blow molding, and is superior to a conventional blow molded container in impact resistance and being leakproof.

Another object of the present invention is to provide a method for manufacturing the above-described liquid container, and a metallic mold used for such a manufacturing method.

According to one of the characteristic aspects of the present invention, a liquid container comprises: an external shell which constitutes the external wall of the container; a flexible internal pouch, which constitutes the internal wall of the container, is virtually identical in shape to the internal space of the external shell, contains liquid, and is separable from the external shell; and one or more pinch-off portions, in which the welding seam between the opposing portions of the internal wall is sandwiched by the opposing portions of the external wall, wherein the internal wall is provided with a pair of regions, which are thicker than the surrounding regions, and are located in a manner to sandwich the welding seam of the internal wall, and in which an air gap is provided between the outward surface of the internal wall and the inward surface of the outer wall.

With the provision of an air gap between the external shell and internal pouch, in the case portion of the pinch-off portion of a liquid container, the air gap functions as a damper when the liquid container is subjected to external impact. Further, the thick regions of the internal wall function like a reinforcement beam, preventing the welding seams of the internal wall from slipping out of the pinch-off portion, preventing thereby the internal pouch from irregularity deforming. As a result, it is difficult for impact to transmit to the internal pouch, and therefore, the pinch-off portion is prevented from being damaged.

Further, the employment of such a structure that makes an air gap function as a damper eliminates the need for making the pinch-off portion of a liquid container outwardly protrude from the outward surface of the liquid container, making it therefore possible to provide a container, the pinch-off portion of which is virtually flush with its adjacencies.

Further, increasing the thickness of the external shell of a container, in the pinch-off portion of the container, not only increases the strength of the external shell, but also increases the welding surface between the opposing portions of the internal pouch, in the pinch-off portion, adding to the fastness of the welding seam of the internal pouch.

According to another characteristic aspect of the present invention, a method for manufacturing a liquid container in accordance with the present invention comprising: an external shell which constitutes the external wall of the container, a flexible internal pouch, which constitutes the internal wall of the container, is virtually identical in shape to the internal space of the external shell, is used to contain liquid, and is separable from the external shell; and one or more pinch-off portions, in which the welding seam between the opposing portions of the internal wall are sandwiched by the opposing portions of the external wall, includes: a step in which a metallic mold, the inward surface of which is virtually identical in shape to the external surface of the liquid container, a first parison which is approximately cylindrical, is smaller in diameter than the mold, and is formed into the external wall of the liquid container, and a second parison which also is smaller in diameter than the mold and is formed into the internal wall of the liquid container, are prepared; a step in which a combination of a part of the resinous first parison and a part of the resinous second parison is pressed into a space between the two halves of the mold, which is correspondent to the pinch-off portion of the liquid container, as the two halves of the mold are clamped in a manner to sandwich the first and second parisons; and a step in which air is blown into the internal space of the second parison to inflate the first and second parisons so that the extended walls of the first and second parisons conform in shape to the inward surface of the mold, with the first and second parisons, that is, the external and internal walls, respectively, remaining separable from each other; and a step in which the internal and external walls are separated from each other, in the immediate adjacencies of the pinch-off portion, to create air gaps in the adjacencies of the pinch-off portion.

According to another characteristic aspect of the present invention, the metallic mold for blow molding a liquid container in accordance with the present invention comprises a combination of the left and right pieces, wherein the portion of the left piece of the metallic mold, correspondent to the pinch-off portion of the container, and the portion of the right piece of the metallic mold, correspondent to the pinch-off portion of the container, are provided with a parison pressing portion for holding a part of the resinous parison, correspondent to the pinch-off portion, to press a part of this portion of the parison into the mold as the left and right pieces of the metallic mold are clamped together, and wherein the portion of the left piece of the metallic mold, correspondent to the pinch-off portion of the container, and the portion of the right piece of the metallic mold, correspondent to the pinch-off portion of the container, are constructed so that a small gap remains between them after the left and right pieces of the metallic mold are clamped together.

Incidentally, in this specification of the present invention, "multi-layer blow molding" means the so-called co-extrusion multi-layer blow molding, in which a multi-layer parison extruded by co-extrusion is sandwiched by a multi-piece mold, and pressurized fluid is introduced into the parison to inflate it.

Further, a term "liquid" is used to include sol as well as plain liquid.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Next, the preferred embodiments of the present invention will be described with reference to the appended drawings.

Embodiment 1

Figure 1:
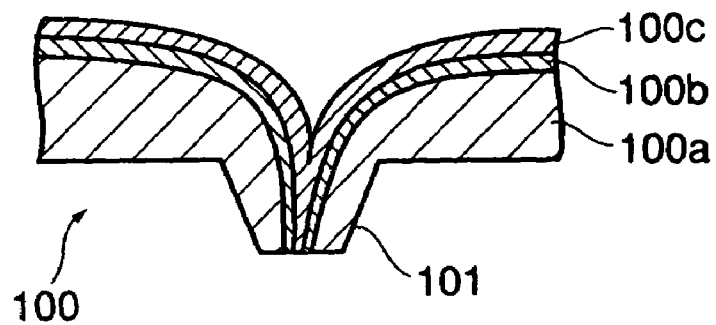
FIG. 1 is a sectional view of the pinch-off portion of an example of a liquid container formed by a blow molding method in accordance with a prior art, and the adjacencies thereof.
Figure 2:
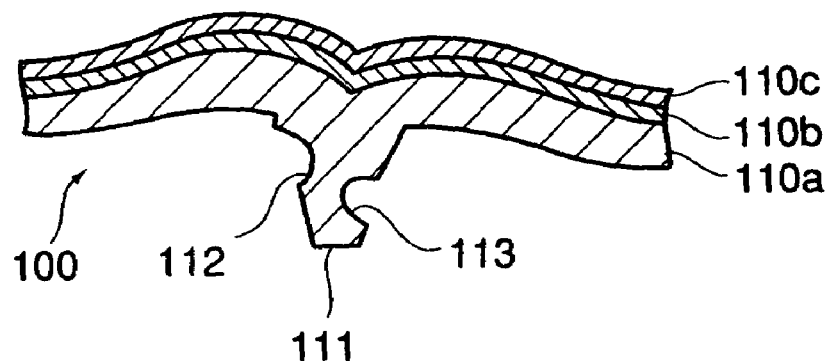
FIG. 2 is a sectional view of the pinch-off portion of an example of a liquid container formed by another blow molding method in accordance with a prior art, and the adjacencies thereof.
Figure 3:
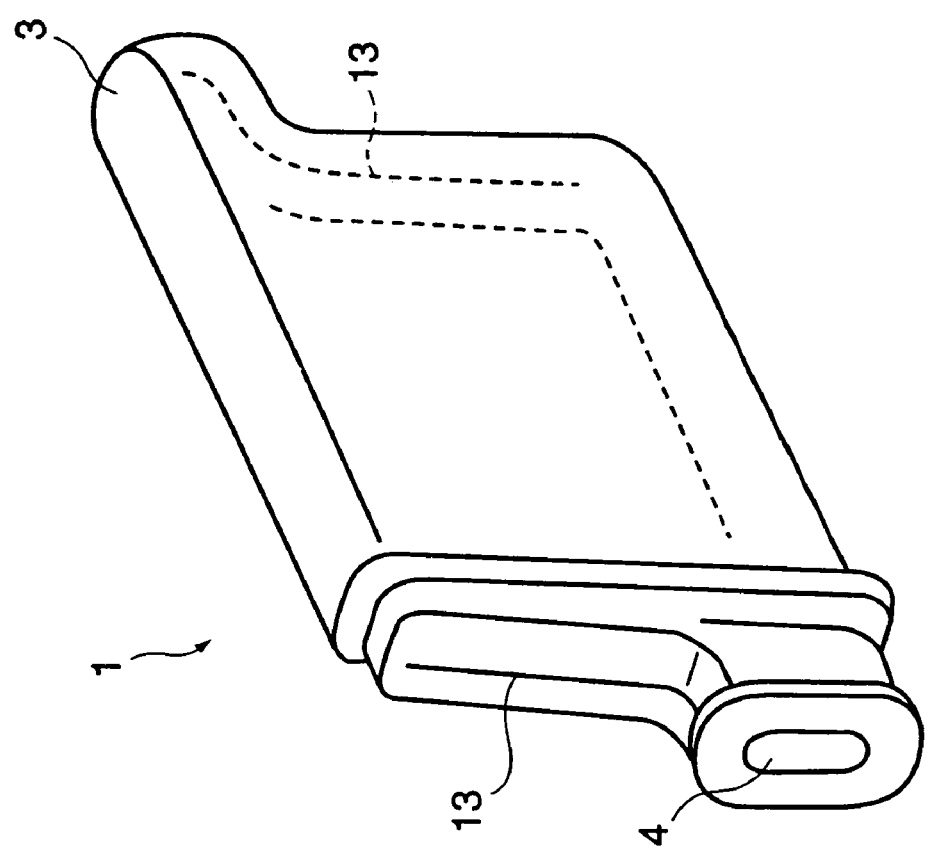
FIG. 3 is a rough perspective view of an embodiment of an ink container in accordance with the present invention.
Figure 4:
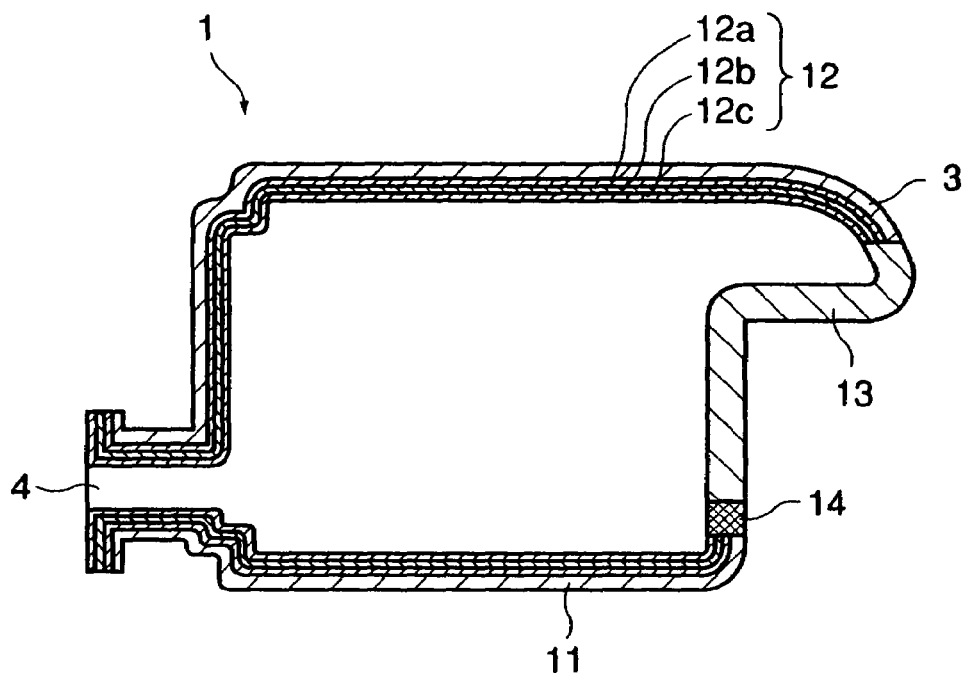
FIG. 4 is a sectional view of the ink container shown in FIG. 3, at a plane which includes the welding seam of the container.

FIG. 3 is a rough perspective view of the ink container in an embodiment of the present invention, and FIG. 4 is a sectional view of the ink container shown in FIG. 3.

The ink container 1 in this embodiment is a hollow container approximately in the form of a polygonal pillar (portions correspondent to edges and points are rounded). It is provided with an ink outlet 4, which projects outward from one end of the ink container, and a knob 3 which projects from the other end. It is removably mounted into a holder (unshown). The ink outlet 4 is provided with a plug (unshown) for hermetically sealing the internal portion 12, which will be described later. As the ink container 1 is mounted into the holder, the connector portion of the holder and the internal space of the internal pouch 12 become connected through the plug, so that the ink within the ink container 1 can be consumed through the connecting portion. The knob 3 is where a user places a hand when removing the ink container 1 from the holder.

Referring to FIG. 4, the ink container 1 is formed by multi-layer blow molding, and has an external shell 11 which constitutes the external wall of the ink container 1, and an internal pouch 12 which constitutes the internal wall of the ink container 1. When fully inflated, the internal pouch 12 is equal or similar, in shape and volume, to the internal space of the external shell 11.

The internal wall (pouch) 12 is flexible, and is separable from the external wall (shell) 11. Therefore, as the ink within the ink containing portion, that is, the internal space of the internal pouch 12, is led out, the internal pouch 12 is allowed to deform without causing the external shell 11 to deform. The internal pouch 12 is constructed so that the thickness of each section of the wall of the internal pouch 12 in the form of an approximately polygonal pillar gradually reduces from the center toward the edges to make the corner portions (which may be rounded) of each section of the wall thinner than the center portion of each section of the wall; in other words, each section of the wall of the internal pouch 12 slightly bulges inward of the internal pouch 12. The direction in which each section of the wall of the internal pouch 12 bulges is the same as the direction in which each section of the wall deforms. Therefore, this structural arrangement for the internal pouch 12 helps the deformation of the ink storing portion; in particular, in the inkjet filed, it helps maintain an optimum amount of negative pressure at the ink outlet 4 as the liquid is led out of the ink storing portion, as described in Japanese Laid-Open Patent Application 9-267483. Incidentally, FIG. 4 was intended to mainly show the laminar structure of the ink container, and does not show the actual relationship in thickness among the plurality layers of the wall of the ink container 1.

The ink container 1 is also provided with an air vent 14, which is located next to one end of the pinch-off portion 13 of the ink container 1, which will be described later. The air vent 14 is a gap between the external shell 11 and internal pouch 12. With the provision of the air vent 14, external air can be introduced between the external shell 11 and internal pouch 12 through the air vent 14, allowing the internal pouch 12 to easily deform as the ink within the ink storing portion is consumed.

The internal pouch 12 is a laminar pouch having three layers: liquid contact layer 12c, elasticity control layer 12b, and gas barrier layer 12a, listing from the inward side. The liquid contact layer 12c is resistant to ink, and the gas barrier layer 12a is superior in preventing gas permeation. These three layers are independent from each other in terms of function, but remain adhered to each other. The elasticity control layer 12b remains virtually constant in elasticity as long as ambient temperature remains with the range in which the ink container 1 is normally used. Thus, the elasticity of the internal pouch 12 is kept virtually constant by the elasticity control layer 12b as long as the ink container 1 is used within the normal temperature range. As long as the liquid contact layer 12c constitutes the innermost layer of the internal pouch 12, the elasticity control layer 12b and gas barrier layer 12b may be switched in position; the elasticity control layer 12b and gas barrier layer 12a may constitute the outermost layer and middle layer, respectively.

Since the internal pouch 12 is structured as described above, the internal pouch 12 satisfactorily displays each of the functions of the liquid contact layer 12c, elasticity control layer 12b, and gas barrier layer 12a. In other words, the elasticity or the like of the internal pouch 12 is prevented, by the provision of only a small number of functional layers, from being seriously affected by the change in ambient temperature.

Regarding the materials for the internal pouch 12, polypropylene is used as the material for the liquid contact layer 12c, or the innermost layer; copolymer of cyclic olein, as the material for elasticity control layer 12b, or the middle layer; and EVOH (saponified EVA (copolymer of ethylene and vinyl acetate)) is used as the material for the gas barrier layer 12a, or the outermost layer. As for the material for the external shell 11, polypropylene, that is, the same material as that for the innermost layer of the internal pouch 12, is used.

The adhesive strength between the adjacent two layers of the three layers of the internal pouch 12 is rendered sufficiently large compared to the adhesive strength (peel strength) between the external shell 11 and internal pouch 12. Therefore, when the ink container 1 is in use, the external shell 11 and internal pouch 12 easily separate from each other while the layers of the internal pouch 12 do not separate from each other.

Since the ink container 1 is formed by multi-layer blow molding as described above, it has two pinch-off portions 13, one on the ink outlet 14 side and the other on the knob 3 side, or the side opposite to the ink outlet side 14. Referring to FIG. 4, one of the pinch-off portions 13 extends from a part of the knob 3, or the rear end of the ink container 1 in terms of the ink container insertion direction, toward the bottom portion of the ink container 1. The other pinch-off portion 13, or the pinch-off portion on the ink outlet 14 side, is not shown in FIG. 4.

Next, the structure of the pinch-off portion 13 will be described with reference to FIG. 5, which is a sectional view of the pinch-off portion of the ink container 1 shown in FIG. 3, at a plane perpendicular to the lengthwise direction of the pinch-off portion 13.

Figure 5:
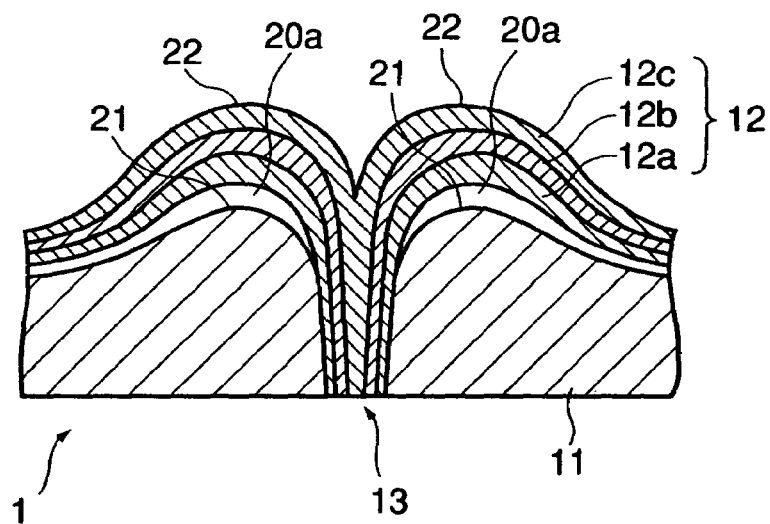
FIG. 5 is a sectional view of the pinch-off portion of the ink container shown in FIG. 3, and its adjacencies, at a plane perpendicular to the lengthwise direction of the pinch-off portion of the container.

As shown in FIG. 5, the tip of the pinch-off portion 13 is not protruding outward from its adjacencies, being virtually flush with the external surface of the ink container 1. Making the pinch-off portion 13 flush with its adjacencies improves the ink container 1 in terms of handing; it makes the ink container 1 easer to handle. It also prevents a safety problem; it prevents a hand from being cut by the pinch-off portions 13. Further, making the pinch-off portion 13 flush with its adjacencies prevents the pinch-off portion 13 from degrading the external appearance of the ink container 1.

The above described structure can be realized using the metallic ink container mold, which does not have a recess, as the reservoir for holding the portion of the resinous parison correspondent to the pinch-off portion 13. More specifically, as the parison to be formed into the ink container 1 is sandwiched by the two-piece metallic mold as the two pieces of the metallic mold are clamped toward each other, the portion of the parison correspondent to the pinch-off portion 13 is pushed inward of the internal space of the mold, by the invasion of the portion of the parison, which has failed to escape into the aforementioned resin reservoir, into the aforementioned small gap between the opposing portions of the two pieces of the metallic mold correspondent to the pinch-off portion 13. As a result, the walls of the external shell 11 and internal pouch 12 are made thicker, creating an inwardly bulging portion 21 (external shell 11) and an inwardly bulging portion 22 (internal pouch 12), on both sides of the welding seam between the opposing portions of the liquid contact layer 12c of the ink container 12.

Figure 10:
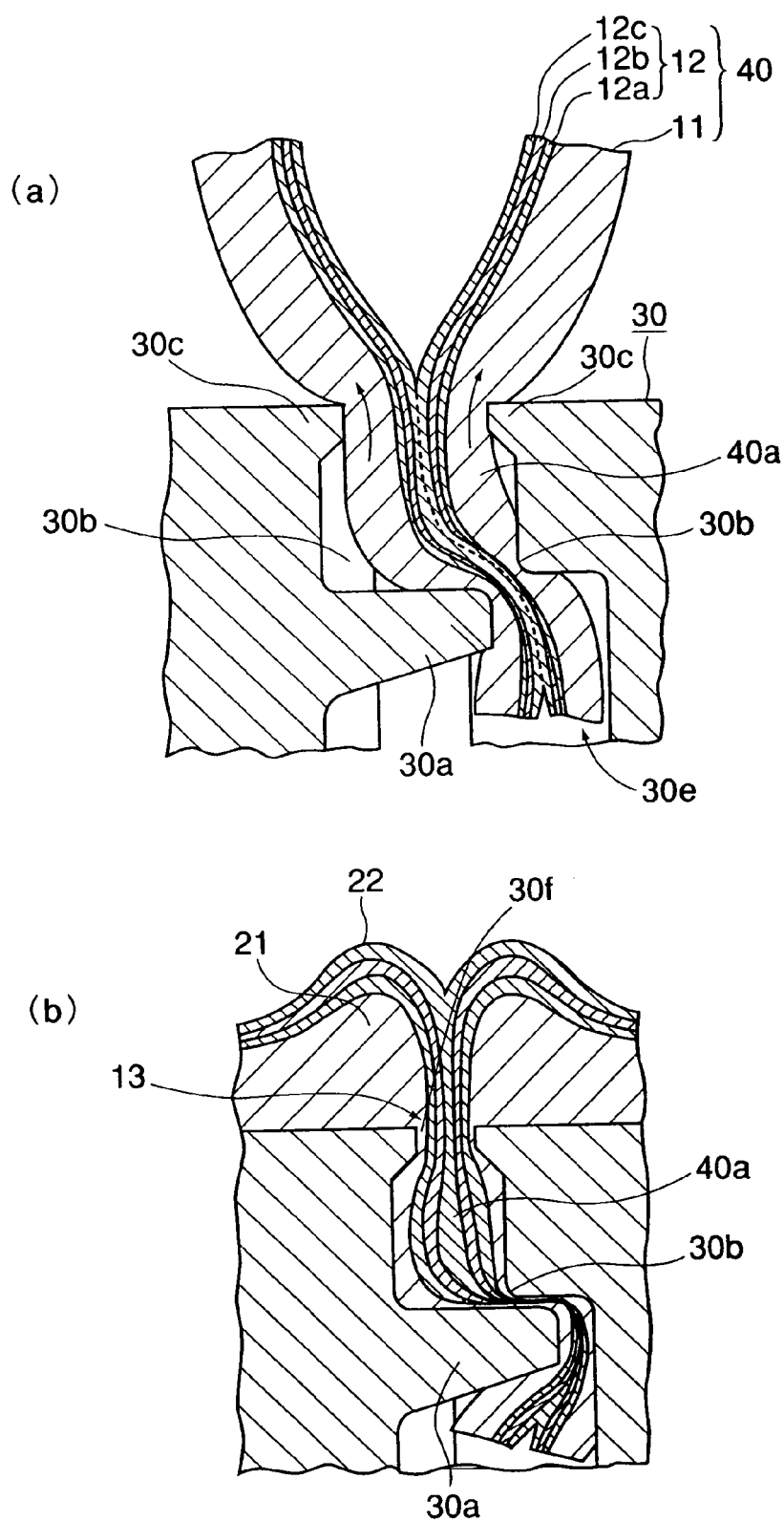
FIG. 10 is a sectional view of the pinch-off portion of the ink container shown in FIG. 8, and the portion of a metallic mold for forming the ink container, correspondent to the pinch-off portion, for depicting the method for manufacturing the ink container, FIGS. 10(a) and 10(b) showing the pinch-off portion during the clamping of the molding, and the pinch-off portion after the clamping of the molding, respectively.

At this time, referring to FIG. 10, the description of the process for forming the bulges 21 and 22 will be supplemented. FIG. 10 is a sectional view of the essential portions of the ink container 1 and metallic mold during the molding of the ink container 1, for describing the method for manufacturing the ink container 1 shown in FIG. 3, FIGS. 10(a) and 10(b) showing the pinch-off portion during the clamping of the molding, and the pinch-off portion after the clamping of the molding, respectively. As shown in FIG. 10(a), the metallic mold 30 comprises the left and right pieces. The portion of the left piece of the metallic mold 30 correspondent to the pinch-off portion 13 is provided with a dam 30b as a parison sandwiching portion for squeezing a parison 40 formed by multi-layer co-extrusion, which will be described later. The parison is cylindrical and is formed by multi-layer co-extrusion, has a resin layer 11 to be formed into the external wall, or the external shell 11, and the resin layers 12a–12c to be formed into the layers of the internal pouch 12. These resin layers 11 and 12a–12c are concentric. When sandwiching the parison 40 with the left and right pieces of the metallic mold 30, first, the parison 40 is pinched by the projection 30a of the left piece, and the portion 30d of the right piece, which is the counterpart of the projection 30a. As the metallic mold 30 is clamped, the portion 40a of the parison 40, that is, the portion which has failed to escape into the resin reservoir 30e, which is the open space on the outward side of the mold 30 with respect to the line connecting the tips of the projection 30a and portion 30d, is pushed into the dam 30b. During this process, as the gap between the projection 30a and portion 30d reduces, the resin portion 40a within the dam 30b is squeezed, being partially moved inward of the metallic mold, into the area in which the pinch-off portion 13 forms, in the direction indicated by an arrow mark in the drawing (from the outward side of the external shell to the inward side of the internal pouch).

Next, referring to FIG. 10(b), after the completion of the clamping of the mold 30 and the subsequent inflation of the parison with the use of fluid such as air, the bulge 21 of the external shell and the bulge 22 of the internal pouch, have been formed by the part of the portion 40a of the parison 40 having been forced into the internal space of the mold 30. In the state shown in FIG. 10(b), the portion of the parison 40 having been squeezed out into the space 30f is still in the space 30f, being connected to the part of the portion 40a in the pinch-off portion 13, and the part of the portion 40a in the dam 30b. These parts of the portion 40a, or flashes, are removed during the deflashing process carried out after the ink container 1 is removed from the mold 30. During the deflashing process, the flashes are removed with reference to the outward surface of the external shell so that the pinch-off portion 13 becomes virtually flush with its adjacencies, and also that the welding seam between the opposing portions of the inner walls is partially exposed. This exposure of the welding seam is useful when forming a gap which will be described later.

In this embodiment, the metallic mold 30 is structured so that at the end of the clamping of the mold 30, the left and right pieces of the mold 30 meet each other without a gap along the parting line, except for the portion correspondent to the pinch-off portion 13 where the parison is pinched; it is structured so that a small gap 30f is provided between the left and right piece of the mold 30, at the position correspondent to the pinch-off portion 13. In other words, the left and right pieces of the mold 30 do not contact each other at the position correspondent to the pinch-off portion 13; it is desired that a small gap 30f is provided between the left and right pieces of the pinch-off portion 13 at the position correspondent to the pinch-off portion 13. This is for the following reason. That is, with the presence of the gap 30f, it is assured that the aforementioned resin portion 40a is partially and continuously pushed into the inside of the mold 30 until the clamping of the mold 30 is completed. Thus, it does not occur that at the end of the clamping of the mold 30, the resinous material is held in the dam 30b by the amount greater than the dam capacity. Therefore, productivity improves.

The thicknesses of the bulge 21 of the external shell and the bulge 22 of the internal pouch are determined by the amount of the portion 40a, that is, the portion of the parison in the area where the parison is pinched, and the viscosity and elasticity of the parison material in the plastic state. In this embodiment, if it is required to increase the thicknesses of the bulges 21 and 22, the distance the projection 30a projects may be increased to increase the amount of the resin to be pushed into the dam 30b, or the capacity of the dam 30b is reduced to make more resin flow into the metallic mold 30, provided that the resin to be used remains the same in viscosity and elasticity.

As for the configuration of the projection 30a, it does not need to be limited to the above described one as long as the projection 30a is enabled to confine a certain amount of the resin in a manner to prevent it from escaping into the open resin reservoir 30e. More concretely, referring to the sectional view in FIG. 10(b), what is necessary is for the distance between the tips of the projection 30a and portion 30d before the completion of the clamping of the metallic mold 30 to be smaller than the distance between the mutually facing portions of the left and right pieces of the mold 30, which mold the pinch-off portion of the ink container 1.

Further, the dam 30b as a resin pressuring portion (squeezing portion) has only to be enabled to push the portion of the parison resin outside the mold 30 into the position of the internal space of the mold 30, in which the pinch-off portion 13 is formed. More concretely, instead of the provision of the projection 30a, the portion of each of the left and right pieces of the mold 30, correspondent to the pinch-of portion 13, may be increased in thickness, and shaped so that a gap, which leads outward to the open resin reservoir on the outward side of the mold 30, like the one in this embodiment, remains between the two pieces of the mold 30 after the completion of the clamping of the mold 30. However, providing a projection such as the one in this embodiment which prevents the resin from escaping into the resin reservoir is preferable, since the provision of such a projection assures that the resin is pushed into the internal space of the metallic mold.

As described above, the external shell 11 and internal pouch 12 are separable from each other. In other words, the external shell 11 and internal pouch 12 have not been welded to each other, and therefore, the portion of the internal pouch 12 in the pinch-off portion 13 is held in the pinch-off portion 13 by remaining pinched between the two bulges 21 of the external shell 11. Since the internal pouch 12 remains pinched by the bulges 21 of the external shell 11, the portion of the internal pouch 12 in the pinch-off portion 13 is prevented from separating from the external shell 11 even though the external shell 11 and internal pouch 12 have not been welded to each other. Further, should the internal pouch 12 and external shell 11 become temporarily separated from each other, the internal pouch 12 is prevented from irregularly deforming, since the ink container 1 is configured so that it is difficult for the internal pouch 12 to become separated from the external shell 11.

Figure 6:
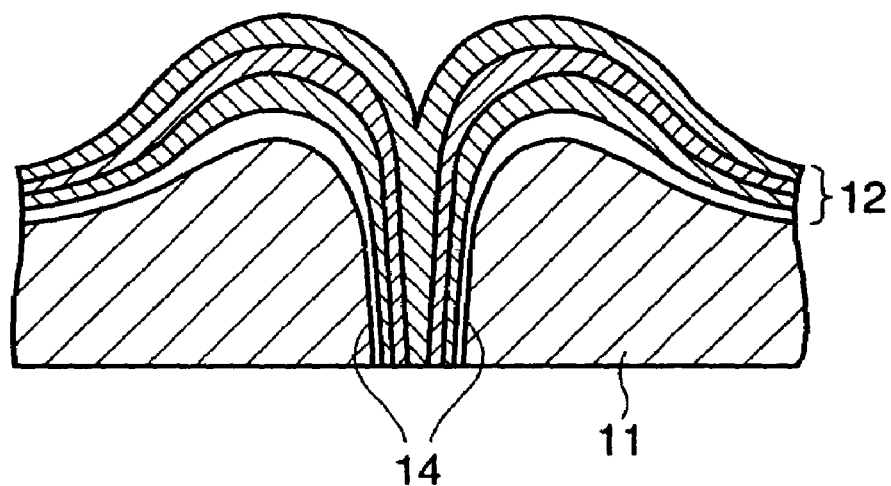
FIG. 6 is a sectional view of the air vent of the ink container shown in FIG. 3, and its adjacencies, at a plane which includes the axial line of the air vent.

Referring to FIG. 6, the air vent 14 (FIG. 4) is formed by separating the external shell 11 from the internal pouch 12. However, the ratio in size of the air vent 14, that is, the ratio in size of the area in which the external shell 11 and internal pouch 12 became separated from each other, relative to the entirety of the pinch-off portion 13, is small. Therefore, the effect of the presence of the air vent 14 upon the retainment of the internal pouch 12 by the external shell 11 is small.

On the other hand, making the internal pouch 12 bulge at the pinch-off portion 13 makes the liquid contact layer 12c, elasticity control layer 12b, and gas barrier layer 12a thicker, increasing therefore the strength of the internal pouch 12 at the base portion of the pinch-off portion 13. Further, making the internal pouch 12 bulge at the pinch-of portion 13 increases welding surface between the opposing two portions of the wall of the internal pouch 12 in the pinch-off portion 13, adding to the fastness of the resultant welding seam. According to the experiments carried out by the inventors of the present invention in order to realize the above described effects of this embodiment, it is desired that the thickness of the bulge 22 of the internal pouch 12 is within a range of 1.5–4.0 times the average thickness of the internal pouch 12 excluding the two bulges 22.

Further, there is provided a cavity or an air gap 20a between the bulge 21 of the external shell 11 and the bulge 22 of the internal pouch 12. However, what is desirable here is that there is an air gap between the outward surface of the bulge 22 of the internal pouch 12 and the corresponding inward surface of the external shell 11. In other words, the presence of the bulge 22 of the external shell 11 is not necessarily required.

There are various methods for creating this air gap; for example, (1) press the pinch-off portion, or apply pressure upon the pinch-off portion, from the outward side of the container in the direction perpendicular to the container surface; (2) allow ambient air to enter the pinch-off portion by temporarily separating the internal pouch and external shell in the pinch-off portion by introducing ambient air between the internal pouch and external shell through an air vent made in the external shell, at an optimal location; (3) allow ambient air to enter the pinch-off portion by deforming the ink container by directly pressing, or indirectly applying pressure upon, the ink container.

Figure 7:
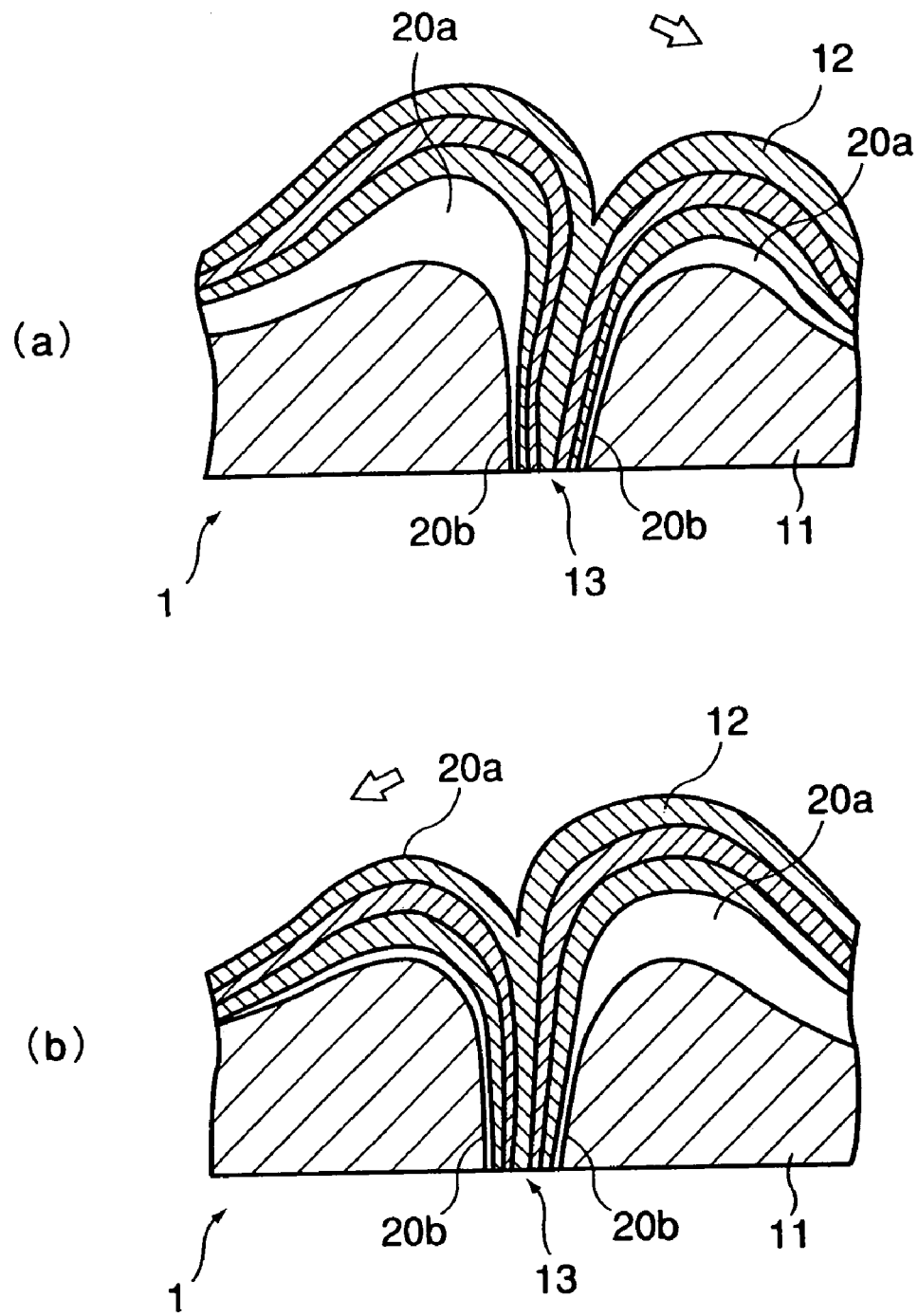
FIG. 7 is a sectional view of the pinch-off portion of the ink container shown in FIG. 3, and its adjacencies, for depicting the reaction of the pinch-off portion which occurs as the ink container is subjected to external force.

Next, referring to FIG. 7, the function of this air gap 20a will be described. FIG. 7 is a sectional view of the pinch-off portion of the ink container shown in FIG. 3, for showing the reaction of the pinch-off portion which occurs as the ink container is subjected to external impact.

As the ink container 1 is subjected to external impact, for example, as the ink container 1 is dropped, the impact from the fall is transmitted from the external shell 11 to the internal pouch 12. Since there is the air gap 20a between the external shell 11 and internal pouch 12, on both sides of the base portion of the pinch-off portion 13, the air gaps 20a play the role of a damper for absorbing the impact, reducing the impact in magnitude as the impact is transmitted to the internal pouch 12.

Further, there is the air gap 20a on each side of the pinch-off portion. Therefore, as the impact transmits to the internal pouch 12, the internal pouch 12 is allowed to sway left, right, or both left and right, depending upon the direction of the impact, to absorb the impact, as shown in FIGS. 7(a) and 7(b). As a result, the impact is reduced in terms of its effect upon the welding seam of the internal pouch 12. Therefore, the ink leakage from the pinch-off portion 13 attributable to the damage to the pinch-off portion, for example, tearing of the pinch-off portion 13, is prevented.

Further, the external shell 11 and internal pouch 12 are separable from each other. Therefore, as the impact applies, an air gap 20b is momentarily formed between the external shell 11 and 12, in the area in which the internal pouch 12 remains pinched by the bulges 21 of the external shell 11. During the presence of the air gap 20b, the impact which has applied to the external shell 11 is virtually blocked by the air gap 20b. Therefore, the impact is further reduced in magnitude as the impact is transmitted to the internal pouch 12 from outside the pinch-off portion, further assuring that the damage to the pinch-off portion 13 by external impact is prevented.

Since the presence of the air gap 20b is momentary, it does not occur that the internal pouch 12 becomes separated from the external shell 11 due to the presence of the air gap 20b. After swaying as shown in FIGS. 7(a) and 7(b), the internal pouch 12 returns to the state shown in FIG. 5, and is cradled by the external shell 11.

As described above, when the ink container 1 is subjected to external impact, the portion of the internal pouch 12, in the pinch-off portion 13, can be prevented from being damaged, by each of the functions of the air gaps 20a and 20b. Of course, the fact that the pinch-off portion 13 is flush with the outward surface of the ink container 1 also makes it difficult for the impact to directly apply to the pinch-off portion 13, substantially contributing to the prevention of the damage to the pinch-off portion 13 by the external impact. It is possible to modify the ink container 1 in terms of external shape, weight distribution, and the like, to prearrange the positions of these two types of the air gaps 20a and 20b so that the probability that the air gaps 20a and 20b take the external impact, and the efficiency with which the air gaps 20a and 20b dump the external impact, are increased; such a modification can better prevent the damage to the pinch-off portion 13.

Embodiment 2

Figure 8:
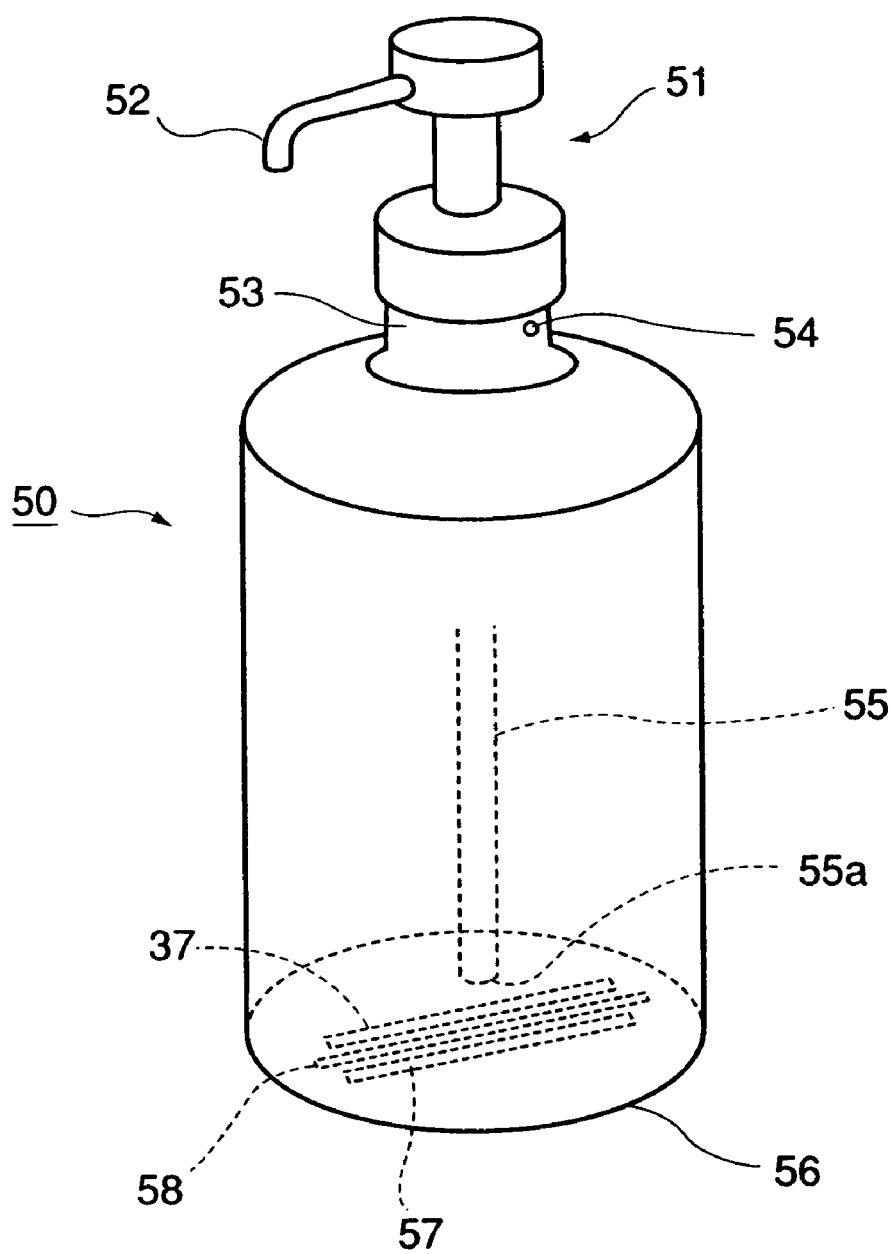
FIG. 8 is a rough perspective view of the second embodiment of a liquid container in accordance with the present invention.
Figure 9:
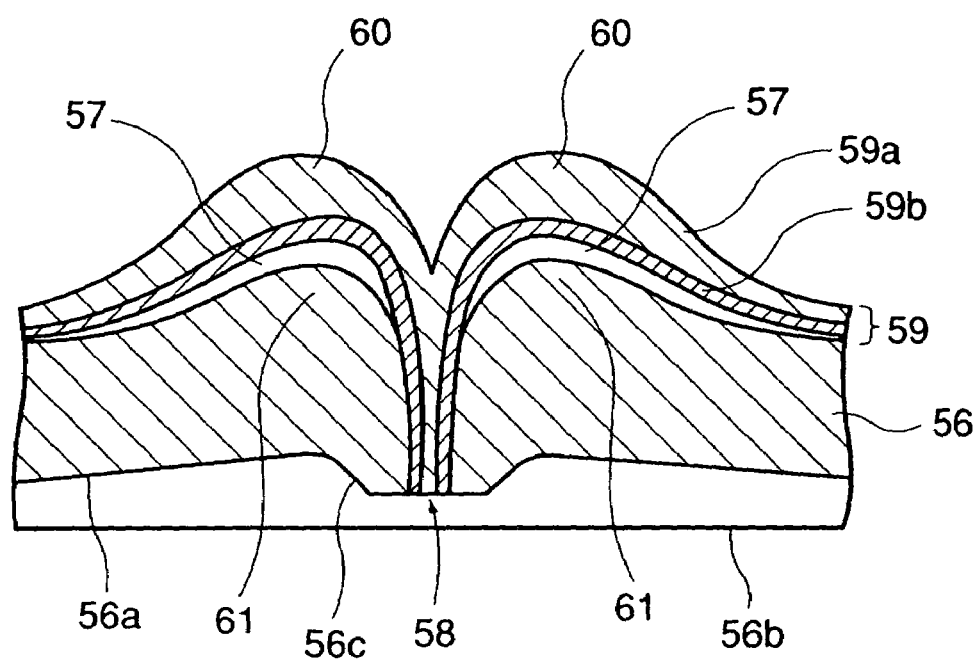
FIG. 9 is a sectional view of the pinch-off portion of the liquid container shown in FIG. 8, and its adjacencies, at a plane perpendicular to the lengthwise direction of the pinch-off portion.

FIG. 8 is a rough perspective view of the liquid container in the second embodiment of the present invention. FIG. 9 is a sectional view of the essential portion of the pinch-off portion of the liquid container shown in FIG. 8, at a plane perpendicular to the lengthwise direction of the pinch-of portion.

The liquid container 50 in this embodiment has an internal pouch which also is separable from the external shell as is the internal pouch in the first embodiment. The internal pouch of this liquid container 50, however, is for containing such liquid as shampoo or rinse, and is provided with a pump 51, which is fitted in the outlet 53 of the liquid container 50. The pump 51 is provided with a nozzle 52. The liquid container 50 is also provided with a tube 55, which is connected to the pump 51, and extends through the internal pouch, with its bottom end 55a reaching close to the bottom wall of the liquid container 50. This bottom wall 56 has a pinch-off portion 58. There is provided an air gap 57 between the outward surface of the thick portion of the internal pouch wall (unshown in FIG. 8), and the inward surface of the external shell, in the adjacencies of the pinch-off portion 58, on both sides, as there is the air gap 20a in the first embodiment. The liquid container 50 is also provided with an air vent 54, which is drilled in the neck portion 53 of the external shell, with the use of an optical processing means.

Next, referring to FIG. 9, the adjacencies of this pinch-off portion 58 will be described in detail.

Also in this embodiment, the air gap 57 is located between the bulge 61 of the bottom wall 56 of the external shell and the bulge 60 of the internal pouch 59, as is the air gap 20a located between the bulge 21 of the external shell 11 and the bulge 22 of the internal pouch 12, in the first embodiment. This embodiment, however, is different from the first embodiment in that the internal pouch 59 has only two layers: inner layer 59a formed of polypropylene to which adhesive resin has been added, and a barrier layer 59b formed of EVOH or the like. Of course, the internal pouch 59 may have only a single layer, depending on the type of the liquid to be stored in the liquid container 50.

The external shell in this embodiment is formed of polypropylene. The outward surface 56b of the bottom wall 56 constitutes the surface which contacts the object on which the container 55 is placed, and the inward surface of the 56a of the bottom wall 56 slightly bulges inward of the container 55, except for the center portion of the surface, creating a recess in the center. In this recess, the pinch-off portion 58, which protrudes outward, fits, with the corresponding portion of the bulge 61 of the external shell 56 forming a projection 56c. Even in the case of a liquid container such as the one in this embodiment, the pinch-off portion of the liquid container can be protected by the provision of the above described air gaps, when the liquid container is subjected to external impact.

A liquid container such as the one in this embodiment can be used, with good results, as a container for storing viscous food such as mayonnaise or ketchup, viscous/foaming cosmetics such as shaving cream, liquid soap, jellied face wash, or the like, in addition to shampoo or rinse. Depending on the liquid to be stored, the outlet of the liquid container may be fitted with a pump such as the one in this embodiment, or may be left as a simple opening.

As described above, according to the present invention, an air gap which is capable of functioning as a damper is provided between the external shell and internal pouch, in the base portion of the pinch-off portion of a multi-layer liquid container, which is formed by multi-layer blow molding, and the layers are made separable among them. Therefore, when the liquid container is subject to external impact, the air gaps functions as a damper, preventing the pinch-off portion from being damaged, preventing therefore the ink leakage from the pinch-off portion.

Also according to the present invention, the pinch-off portion is made virtually flush with its adjacencies, on its outward side. Therefore, the various problems which occur if the pinch-off portion is projecting from the outward surface of the liquid container can be prevented.

Also according to the present invention, the thickness of the external shell is increased in the adjacencies of the pinch-off portion, and/or the thickness of the internal pouch is increased on both sides of the pinch-off portion in which the opposing portions of the internal pouch are welded to each other. Therefore, the strength of the portions of the external shell and internal pouch, in the pinch-off portion and in its adjacencies, is increased, and also the welding surface between the opposing two portions of the internal pouch is increased, increasing the fastness of the welding seam in the pinch-off portion.

While the invention has been described with reference to the structures disclosed herein, it is not confined to the details set forth and this application is intended to cover such modifications or changes as may come within the purposes of the improvements or the scope of the following claims.

What is claimed is:

1. A liquid container comprising:

an outer wall forming a casing;

an inner wall forming an inner bladder for accommodating liquid, said inner bladder having an outer shape substantially equivalent to an inner shape of said outer wall and being separable from said casing, said inner wall having multiple layers including an elasticity control layer;

a pinch-off portion where portions of said inner wall are welded to each other and are pinched by said outer wall to be supported by said outer wall, wherein a part of said inner wall forming said pinch-off portion is exposed to outside of said casing, said inner wall includes a thicker portion having a larger thickness than another portion of said inner wall, at both sides of the welded portion, and the thicker portion is convex toward said inner bladder; and a cavity provided between an outer surface of the thicker portion of said inner wall and an inner surface of a corresponding portion of said outer wall, wherein the cavity exists in the state when liquid is within the inner bladder, and said thicker portion of said inner wall is movable by the cavity, and when the liquid is within the inner bladder, the cavity includes a first gap and a second gap, the first gap being larger than the second gap when the container is subjected to an external impact and thereby providing a dampening effect.

2. A liquid container according to claim 1, wherein an outer part of said pinch-off portion is substantially flush with a portion of said casing adjacent thereto.

3. A liquid container according to claim 1, wherein a thickness of said casing is thicker at said pinch-off portion than another portion.

4. A liquid container according to claim 1, wherein an air vent for fluid communication with ambience is formed between said casing and said inner bladder.

5. A liquid container according to claim 4, wherein said inner bladder has a generally polygonal prism configuration, wherein said inner wall has such a thickness distribution that thickness is smaller at corner portions of the polygonal prism configuration than central portions of the sides constituting the shape.

6. A liquid container according to claim 1, wherein said inner bladder deforms so as to produce a negative pressure at a liquid outlet of said container with discharge of the liquid from said container.

7. A liquid container according to claim 1, further comprising a liquid contact layer as one of said multiple layers.

8. A liquid container according to claim 7, further comprising a gas barrier layer as one of said multiple layers.

9. A liquid container according to claim 1, further comprising a gas barrier layer and a liquid contact layer as said multiple layers, with said elasticity control layer being disposed between said gas barrier layer and said liquid contact layer.

* * * * *

UNITED STATES PATENT AND TRADEMARK OFFICE
CERTIFICATE OF CORRECTION

| | | |
|---|---|---|
| PATENT NO. | : 7,051,893 B2 | Page 1 of 1 |
| APPLICATION NO. | : 09/968013 | |
| DATED | : May 30, 2006 | |
| INVENTOR(S) | : Shozo Hattori et al. | |

It is certified that error appears in the above-identified patent and that said Letters Patent is hereby corrected as shown below:

ON TITLE PAGE ITEM [56] REFERENCES CITED:

FOREIGN PATENT DOCUMENTS, "EP     1108592     6/2001" should read --EP     1108 592     6/2001--.

COLUMN 6:

Line 29, "gas barrier layer 12b" should read --gas barrier layer 12a--.

COLUMN 9:

Line 10, "pinch -of" should read --pinch-off--.
Line 43, "retainment" should read --retention--.

COLUMN 11:

Line 53, "the 56a" should read --56a--.

Signed and Sealed this

Fourth Day of December, 2007

JON W. DUDAS
*Director of the United States Patent and Trademark Office*